United States Patent [19]

King

[11] Patent Number: 4,911,727
[45] Date of Patent: Mar. 27, 1990

[54] ANIMAL FEEDER

[76] Inventor: Brent A. King, Rural Route 2, Victoria, Ill. 61485

[21] Appl. No.: 330,401

[22] Filed: Mar. 29, 1988

[51] Int. Cl.$^4$ .............................................. A01K 5/01
[52] U.S. Cl. ..................................... 119/53; 119/51.5; 119/52.1
[58] Field of Search ................. 119/51.5, 53, 52 R, 119/72, 74, 75

[56] References Cited

U.S. PATENT DOCUMENTS

| | | | |
|---|---|---|---|
| 1,553,502 | 9/1925 | Boyes | 119/51.5 |
| 2,919,671 | 1/1960 | Beachy | 119/53 |
| 4,377,130 | 3/1983 | Schwieger | 119/51.5 |
| 4,421,060 | 12/1983 | Frush et al. | 119/51.5 |
| 4,790,266 | 12/1988 | Kleinsasser et al. | 119/51.5 |
| 4,825,811 | 5/1989 | O'Kelley | 119/51.5 |

Primary Examiner—John Weiss
Attorney, Agent, or Firm—Marshall, O'Toole, Gerstein, Murray & Bicknell

[57] ABSTRACT

An animal feeder of the type in which a feed hopper discharges feed downwardly onto a shelf which intercepts the feed so that it does not drop directly to a trough under the hopper and shelf but requires action by the animal to brush the feed off the shelf. In conjunction with the above, a water supply line runs closely beneath the shelf and has at least one fitting or nipple directed laterally outwardly over the trough from which nipple the animal may drink directly. The nipple is of the type minimizing discharge of water directly into the trough. The shelf is so fashioned as to substantially prevent the animal from eating feed directly from the shelf.

4 Claims, 2 Drawing Sheets

ANIMAL FEEDER

BACKGROUND AND SUMMARY OF THE INVENTION

It is well known in the feeding of animals, especially hogs, to provide a feeding hopper having downwardly converging sides terminating at a feed opening through which feed descends by gravity to a shelf spaced below the opening and so fashioned that the feed is intercepted by the shelf and lies on the shelf at an angle of repose and thus does not fall directly to a trough beneath the shelf. In some prior feeders, animal-actuated means is used to move the feed from the shelf to the trough. In other feeders, reliance is placed on the animal to sweep the feed off the shelf with its snout. In still other feeders, the animal is able to eat dry feed directly from the shelf and has the further choice of eating wet feed from the trough by means of animal-actuated watering means that discharge directly into the trough.

There are several schools of thought as to how hogs should be fed, considering weight gain, elapsed time, etc., with respect to marketing the best animals. According to the present invention, the feeding system is designed to enable the hogs to eat dry feed and to obtain drinking water from means enabling the animal to drink directly from a nipple or fitting so arranged that the water does not discharge directly into the feed in the trough. The arrangement is such that the hogs do not eat directly rom the shelf beneath the hopper but rather must brush or sweep the feed off to the trough. This avoids wetting of the feed on the shelf and thus eliminates clogging of the hopper discharge by caked feed. Further, it can be shown that an animal will not eat as much if he has to go elsewhere for water, as to a location remote from the feeder It is important that the animal obtain clean drinking water, rather than water mixed with feed obtained from the trough. Also, while the animal searched elsewhere for water, he loses feed which drops from his mouth.

A further feature of the invention is to design the shelf so as to prevent the animal from closing his jaws on the shelf, thereby preventing direct feeding from the shelf. A still further feature is the provision of means for regulating the size of the feed opening and thus the amount of discharge to the shelf. Still further, the water fittings are arranged at angles convenient to animals so as to facilitate direct drinking from the nipples.

Further features and advantages will appear as a preferred embodiment of the invention is disclosed in the ensuing description and accompanying drawings.

DESCRIPTION OF THE DRAWING FIGURES

DETAILED DESCRIPTION OF A PREFERRED EMBODIMENT OF THE INVENTION

Figure 1:
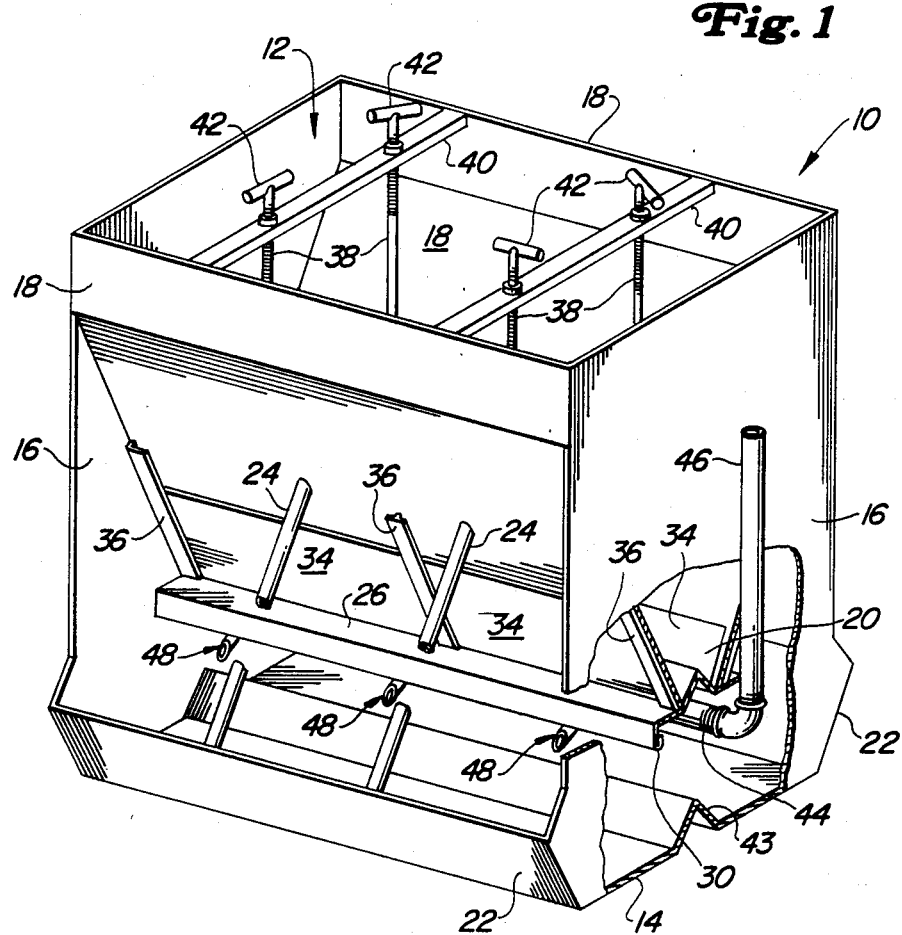
FIG. 1 is a perspective of a preferred form of feeder.
Figure 3:
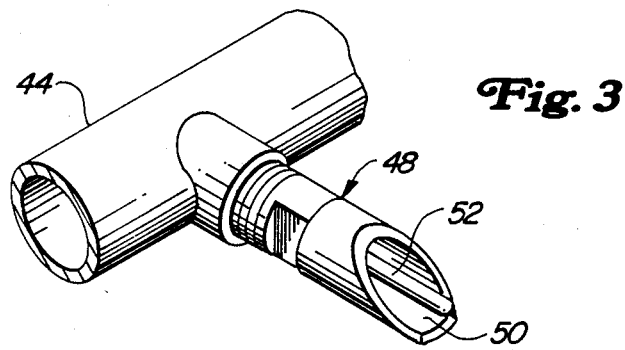
FIG. 3 is an enlarged perspective of a fitting or nipple.
Figure 2:
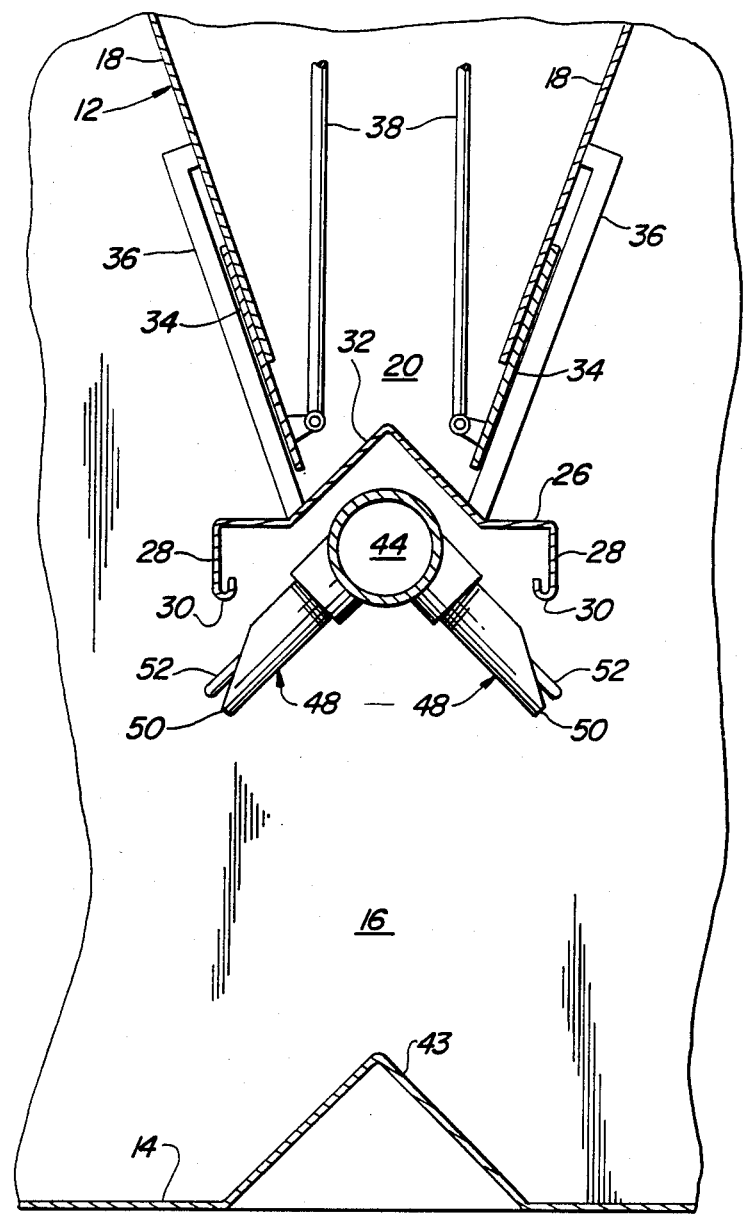
FIG. 2 is an enlarged transverse section of the feeder showing the relationship among the hopper, trough, shelf and water supply means.

The feeder is essentially a box-like structure 10 made up of a hopper 12 disposed over a trough 14 and secured to the trough by a pair of end walls 16. The hopper is elongated and, in the present case, provides three feeding areas at each side. The hopper has opposed downwardly converging side walls 18 that terminate at a bottom feed discharge opening 20 (FIG. 2). The side walls are braced to the sides 22 of the trough by a plurality of divider rods 24 which also function to keep the hogs'heads concentrated in their respective feeding zones or areas so that they do not interfere with their neighbors. In a typical arrangement, by way of example and not limitation, the structure may be on the order of 34 inches long, 36 inches high and having a width of 26 inches. The trough has the same length as the hopper and its sides 22 rise to a height of about five to six inches.

A platform or shelf 26 is spaced below the bottom of the hopper in such position as to intercept the flow of feed via the feed opening 20 so that the feed does not run immediately to the trough but accumulates on the shelf, at each side of the longitudinal centerline of the structure, at angles of repose as known in the art so that the feeding from the hopper to the shelf becomes automatic as feed is removed from the reposed accumulations on the shelf. In the present case, removal of such feed is caused by the animal using his snout to sweep or brush the feed off so that the feed drops into the trough, the lateral width of the shelf being less than that of the trough. According to the present invention, the shelf is relatively narrow, its lateral width being such that the hog cannot eat directly from the shelf, a result accentuated by the provision at each terminal or outer end portion of the shelf of a depending flange 28 of such vertical dimension as to prevent the hog from closing his jaws in chewing fashion. The bottom edge of each flange is rolled as at 30 to prevent injury to the hog's mouth. The lateral dimension of the shelf at each side of the feed opening 20 is relatively narrow, for example, about one to one and one-half inches and each flange depends about the same amount. Further, the angle between each lateral shelf portion and the adjacent sloping side wall 18 of the hopper is about sixty to seventy-five degrees, providing a "tight corner" that further limits the hog's activity in this area to brushing the feed off and into the trough The shelf of course runs the length of the hopper and is provided centrally with an upstanding divider 32 so shaped as to direct feed oppositely onto the shelf in symmetrical fashion in those instances when feed control shutters 34 are set equally at opposite sides of the feed opening 20. Each shutter is slidable upwardly and downwardly along its side wall away from and toward the shelf, being carried by suitable guides 36 and operated by vertical rods 38. Each rod extends threadably through a cross bar 40 spanning the top of the hopper and is equipped with a handle 42 for enabling easy turning of the rod. The shutters may be independently adjusted for varying the opposite feed outlets to opposite sides of the shelf divider 32 and, of course, either shutter may be closed completely. This accommodates different feeding habits of the animal and also enables feeding of different-sized hogs at opposite sides of the trough, especially considering the central divider 43 in the trough. Also, shutter adjustment can compensate for feed of different particulates.

The feeder is provided with means for furnishing drinking water to the hogs. In this case, a supply means or line 44 is fixedly arranged beneath the shelf, preferably being accommodated by the upwardly divergent shelf divider 32. The line is fed by a supply pipe 46 that may be connected to any water source (not shown). The line 44 is provided with a plurality of fittings or nipples 48, here six in number, for example. These are arranged in oppositely directed pairs, each nipple projecting laterally outwardly so as to be convenient to the animals. In a practicable arrangement the angle is in range of about horizontal to thirty-five to forty degrees below the horizontal. Each nipple further has an outer terminal end portion opening at 50 and being disposed substantially directly below or in vertical alignment with the proximate outer end of the shelf. The nipple is tubular and the opening 50 is afforded by cutting the nipple off at an angle so that the opening faces upwardly as will as outwardly and the bottom of the nipple serves as a shield preventing direct discharge of water to the trough. Each nipple has an actuator 52 which the hog actuates via his mouth to operate a valve (not shown) so as to furnish clean drinking water directly to the hog rather than having the water mixed with feed and thereby avoiding the "swimming pool" effect of water in the trough. At elevated temperatures, the trough water becomes hot and unpalatable. Another advantage of desired water supply to the animal is that waste (elimination from the animal) is minimized and does not overload the sewage pit.

As will be seen from the foregoing, a simple design has been provided to furnish adequate feed and drinking water to the animals with only incidental mixing of feed and water, especially on the shelf, since, if the hogs cannot eat directly from the shelf, they are very much less likely to slaver on the shelf, all of which substantially avoid caking and clogging at the feed opening. Features and advantages other than those pointed out will have become apparent to those versed in the art, as will many modifications in the preferred embodiment of the invention, all without departing from the spirit and scope of the invention.

I claim:

1. An animal feeder comprising:
   an elongated trough having a bottom;
   an elongated hopper located above the bottom of said trough;
   said hopper having an inclined sidewall extending downwardly and inwardly toward a hopper bottom discharge opening;
   a shelf spaced below said hopper bottom discharge opening and above the bottom of said trough;
   said hopper comprising means for storing feed and for dispensing feed through said hopper bottom discharge opening;
   said shelf comprising means for receiving and holding feed dispensed from said hopper through said discharge opening;
   said shelf and said inclined hopper side wall comprising means cooperating to permit an animal to sweep feed from said shelf into said trough while substantially preventing the animal from feeding directly from said shelf;
   and means for permitting an animal to feed directly from said trough.

2. An animal feeder as recited in claim 1 wherein:
   said shelf extends outwardly away from said discharge opening to a shelf terminal edge;
   said shelf includes a flange depending from said terminal edge;
   and said flange comprises means for preventing the animal from closing its jaws around the shelf.

3. An animal feeder as recited in claim 1 wherein:
   said shelf is fixed against movement;
   and said hopper side wall is inclined upwardly and outwardly beginning at said hopper discharge opening.

4. An animal feeder as recited in claim 1 and comprising:
   water supply means located below said shelf and spaced above the bottom of said trough;
   said water supply means comprising an animal-mouth-actuated dispenser comprising means from which an animal can drink directly, without dispensing water into the trough.

* * * * *

REEXAMINATION CERTIFICATE (1589th)
United States Patent [19]
King

[11] B1 4,911,727

[45] Certificate Issued Nov. 12, 1991

[54] ANIMAL FEEDER

[75] Inventor: Brent A. King, Victoria, Ill.

[73] Assignee: King Systems, Inc., Ill.

Reexamination Request:
No. 90/002,203, Nov. 14, 1990

Reexamination Certificate for:
Patent No.: 4,911,727
Issued: Mar. 27, 1990
Appl. No.: 330,401
Filed: Mar. 29, 1988

[51] Int. Cl.$^5$ ............................................. A01K 5/01
[52] U.S. Cl. .................................... 119/53; 119/51.5; 119/52.1
[58] Field of Search ..................... 119/52.1, 53, 53.5, 119/51.01, 51.5

[56] References Cited

U.S. PATENT DOCUMENTS

| | | | |
|---|---|---|---|
| 555,909 | 3/1896 | Smith . | |
| 4,660,508 | 7/1989 | Kleinsasser | 119/51.5 |
| 4,889,078 | 12/1989 | Smiley | 119/53.5 |

Primary Examiner—John G. Weiss

[57] ABSTRACT

An animal feeder of the type in which a feed hopper discharges feed downwardly onto a shelf which intercepts the feed so that it does not drop directly to a trough under the hopper and shelf but requires action by the animal to brush the feed off the shelf. In conjunction with the above, a water supply line runs closely beneath the shelf and has at least one fitting or nipple directed laterally outwardly over the trough from which nipple the animal may drink directly. The nipple is of the type minimizing discharge of water directly into the trough. The shelf is so fashioned as to substantially prevent the animal from eating feed directly from the shelf.

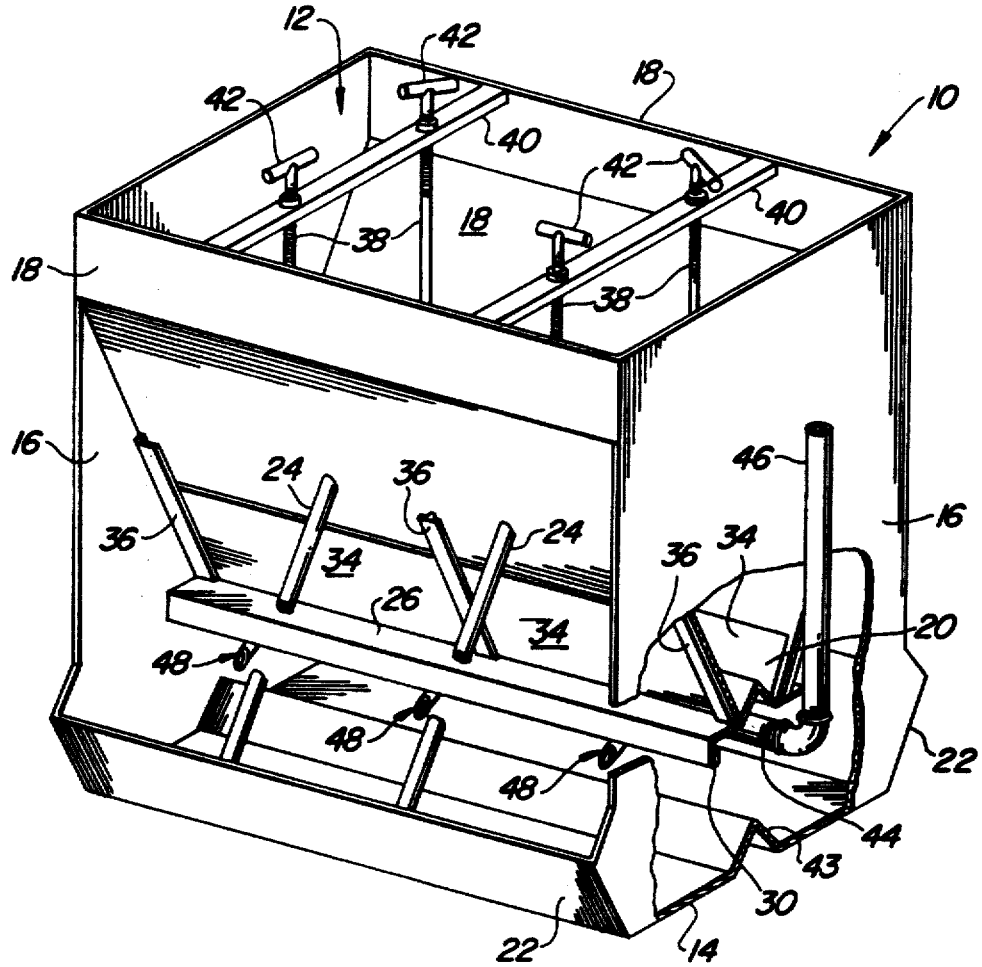

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1, 2, 3 and 4 is confirmed.

* * * * *